United States Patent [19]

Filthuth

[11] Patent Number: 5,059,802

[45] Date of Patent: Oct. 22, 1991

[54] COLLIMATOR FOR MEASURING RADIOACTIVE RADIATION

[76] Inventor: Heinz Filthuth, Bahnhofstrasse 29, D-7540 Neuenburg, Fed. Rep. of Germany

[21] Appl. No.: 522,713

[22] Filed: May 14, 1990

[30] Foreign Application Priority Data

May 12, 1989 [DE] Fed. Rep. of Germany ....... 3915613

[51] Int. Cl.[5] ......................... H01J 47/00; G01T 1/00

[52] U.S. Cl. ................................. 250/374; 250/505.1; 250/393; 250/328

[58] Field of Search .................. 250/393, 385.1, 336.1, 250/374, 328, 505.1

[56] References Cited

FOREIGN PATENT DOCUMENTS 3735296 4/1989 Fed. Rep. of Germany .
2190787 11/1987 United Kingdom ............ 250/385.1

*Primary Examiner*—Carolyn E. Fields
*Assistant Examiner*—James E. Beyer
*Attorney, Agent, or Firm*—Spensley Horn Jubas & Lubitz

[57] ABSTRACT

A plate-shaped collimator with a plurality of through-bores for increasing locality-sensitivity during measurement of the radiation from a radioactive substance, by means of a detector disposed adjacent the collimator, wherein the collimator is provided with an insulting core having two opposed major surfaces, two electrically conductive layers each disposed on a respective collimator surface, and a source connected for applying a voltage for creating, between the conductive layers, an electrical field which acts on charged particles emanating from the radioactive substance to exert on these particles a force having a main component which is directed towards the detector in a direction substantially perpendicular to the conductive layers.

21 Claims, 2 Drawing Sheets

COLLIMATOR FOR MEASURING RADIOACTIVE RADIATION

FIELD OF THE INVENTION

The invention relates to a plate-shaped collimator with a plurality of through-bores for increasing locality, or positional, sensitivity of a measuring device during measurement of the radiation of radioactive substances, in particular $\beta$ radiations, by means of a detector, for example a location-sensitive, one- or two-dimensional proportional counting tube.

BACKGROUND OF THE INVENTION

Measuring of radioactive radiation emanating from an active ingredient applied to a carrier has attained increased importance, for example in medical laboratory technology.

A basic disadvantage of such measurements is found in that the radiation emanating from the carrier in general extends over a spatial angle of $2\pi$, which corresponds to the surface of a hemisphere. Corresponding conditions prevail with respect to secondary radiation. The accuracy of the locality-sensitive measurement is inevitably harmed by this effect.

In known devices an attempt is therefore made to bring the entrance window of the locality-sensitive counting tube as close as possible to the carrier surface to which the radioactive substance has been applied to keep this effect as small as possible. However, this method inevitably has its limits, for example because of contamination of the underside of the detector or the danger of damage to the detector interior by the radioactive sample.

A known alternative to this is the use of a plate-shaped collimator with a plurality of through-bores or -slits extending perpendicular to its surface; such a collimator may be disposed between the carrier and the detector. The detector in such a device may be, for example, a two-dimensional proportional counting tube, as disclosed, for example, in German Published, Non-examined Patent Application DE-OS 37 35 296. Depending on the bore diameter or the width of the slits and the thickness of the collimator, only a very small fraction of the isotropic radiation is selected from the "available" spatial angle $\Omega$, which extends by the amount of $\Delta\Omega$ at right angles to the carrier surface. By means of this, the particles/rays which extend "too obliquely" are eliminated and local resolution is increased. However, unfortunately, connected with the elimination of the particles/rays not desired for local resolution is the disadvantage that these "undesired" particles/rays cannot make a contribution to the counting rate of the detector and that because of this the percentage measuring sensitivity of the detector is reduced to the same extent as the ratio of the spatial angle area $\Delta\Omega$ "selected" by the collimator to the total spatial angle $\Omega$. This can be briefly expressed as:

$$I/I_O=2\pi\ (1-\cos\Theta),$$

where $\Theta$ is the angle of divergence of the radiation. Typical values for the ratio $I/I_O$ are approximately 1%, which indicates a corresponding unsatisfactory reduction of the detector sensitivity.

SUMMARY OF THE INVENTION

It therefore is an object of the invention to provide a collimator of the above-described type in which, with unchanged collimator effect, the measuring sensitivity of the detector used is reduced by a dramatically lesser amount.

This and other objects are achieved, according to the present invention, by providing such a collimator with an insulator core which is equipped on both sides with electrically conductive layers, between which a voltage exists. For example, this collimator is disposed between a carrier of a radioactive substance to be measured and the entrance window of a locality-sensitive detector and the voltage applied between the conductive layers exerts a "suction effect" on the emitted or ionized particles so that the major part of the emitted particles is directed into the entrance window of the detector.

Such a collimator thus practically operates as an "amplifier" with an "amplification factor" of 10 to 50. Apparently the greater portion of the primary ions, electrons in this case, of the totality of the radiation located below the respective collimator bore is pulled upwardly through the bore or slit by the applied electrical field. In other words, particles which, without this suction effect, would just miss the lower entrance cross section of a bore of the collimator plate or would be absorbed inside the through-bore, are directed by means of the suction field to the entrance window of the locality-sensitive detector, and thus contribute to the counting rate and increase the measuring sensitivity.

By proper selection of the thickness of the collimator plate, the number of through-bores and of their cross section, such a collimator can furthermore be adapted in a simple manner to the locality-sensitive detector to be used. For example, for the "cooperation" of the collimator in accordance with the invention with a two-dimensional, locality-sensitive counting tube in accordance with German Published, Non-examined patent application DE-OS 37 35 296, a collimator plate in which the insulator core is approximately 5 mm thick, the diameter of the through-bores is approximately 0.5 to 1 mm and a voltage of approximately 1,000 V is applied between the two electrically conductive layers, has proven to be practical. By use of these parameters it is possible to increase the measuring sensitivity, i.e. to increase the counting rate by a factor of approximately 50, in comparison with a collimator plate without the field applied. For example, beta rays of 14C, 35S, 32P can be measured, but other radiation sources can also be detected without difficulty, for example tritium or 125 J.

Another possible use of the collimator in accordance with the invention is by "integration" in a detector, for example in a flow counting tube (locality-sensitive, if required). In this case the lower conductive layer of the collimator plate forms the entrance plane of the counting tube and the upper conductive plate is used as a cathode plane. Low-energy, ionizing radiation, such as tritium-$\beta$-radiation or 125-J $\beta/\delta$-radiation, can be particularly easily detected.

In this connection it is possible to realize open counting tubes with a very large, open entrance window for the direct detection of, for example, tritium contamination.

An exemplary embodiment of the collimator according to the invention will be explained with reference to two examples shown in the drawings.

DESCRIPTION OF THE PREFERRED EMBODIMENTS

Figure 1:
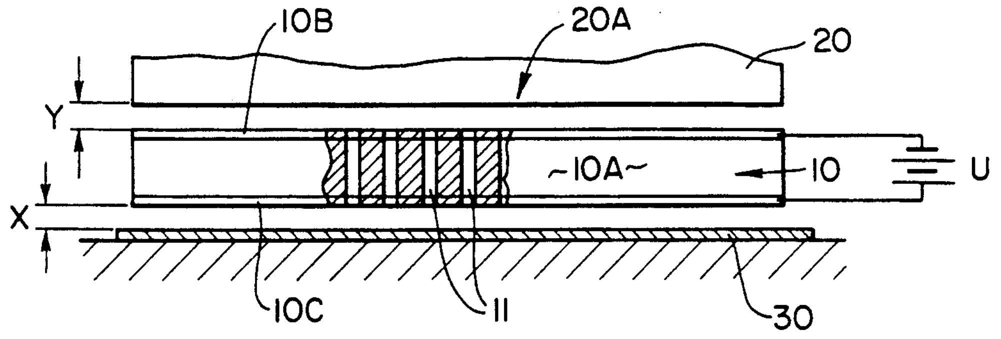
FIG. 1 is a side view, partly in cross section, of a collimator according to the invention constructed for use outside of a detector.

The collimator 10 shown in FIG. 1 is in the form of a plate and comprises an insulator core 10A made, for example, of epoxy fiberglass G-10, and electrically conductive layers 10B and 10C applied to the top and bottom, respectively, of core 10A. A voltage source is connected to apply a voltage U between layers 10B and 10C. Collimator plate 10 is located at a distance x above a carrier 30 carrying a source of radioactive radiation, for example a plate with radioactively marked biological substances applied to it.

At a distance y above collimator 10, a locality-sensitive detector 20 is located. Detector 20 may be, for example, a two-dimensionally operating counting tube of the type disclosed in German Published, Non-examined patent application DE-OS 37 35 296 Detector 20 has an entrance plane 20A.

In a known manner, through-bores 11 provided in collimator 10 extend perpendicular to electrically conductive layers 10B and 10C. The length, which corresponds to the thickness of the collimator plate, and diameter of each bore 11, together with the distances x and y, define the fraction $\Delta\Omega$ of the spatial angle $\Omega$ which is sensed by the entrance plane 20A of the locality-sensitive counting tube 20.

In this first example of use, collimator 10 is a separate component which, so to speak, serves as a "base" for a suitable detector.

Figure 2:
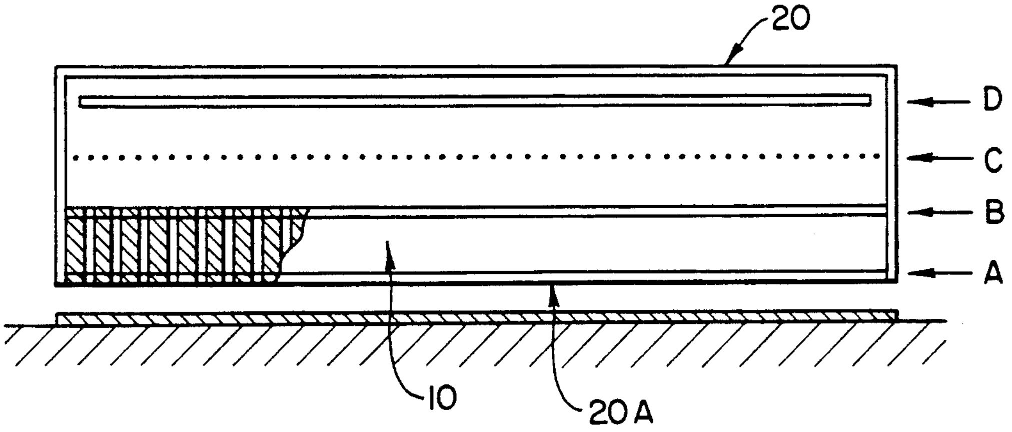
FIG. 2 is a view similar to that of FIG. 1 of a collimator integrated with a detector.

In contrast to this, in the second example shown in FIG. 2, collimator 10 is integrated into a counting tube which contains a total of four planes A, B, C, and D.

The lowest plane A is formed by the lower conductive layer 10C of collimator 10 and, together with the housing of the counting tube, is connected to zero potential.

The next higher plane B is formed by upper conductive layer 10B of collimator 10 and, for example, is connected to a potential of +100 to +2000 volts, and preferably +1,000 volts, by means of which the suction field between plane A and plane B is generated. Plane B simultaneously forms the lower cathode plane.

The third plane C is the anode plane, made of gold-plated tungsten wires with a diameter of 30$\mu$ and at a distance of approximately 2 mm from each other. Plane C is connected to a potential of +2,000 Volts.

The topmost plane D forms the upper cathode plane and is connected to a potential of +1,000 Volts.

The distance between the planes themselves is less than 10 mm, and is for example 2 mm.

The detector is a flow counting tube with a suitable counting gas, for example 90% argon, 10% methane. The mode of operation and the effect of the "suction field collimator", when used in accordance with FIG. 1, is shown by the example of a through-bore 11 in FIGS. 3 and 4.

Figure 3:
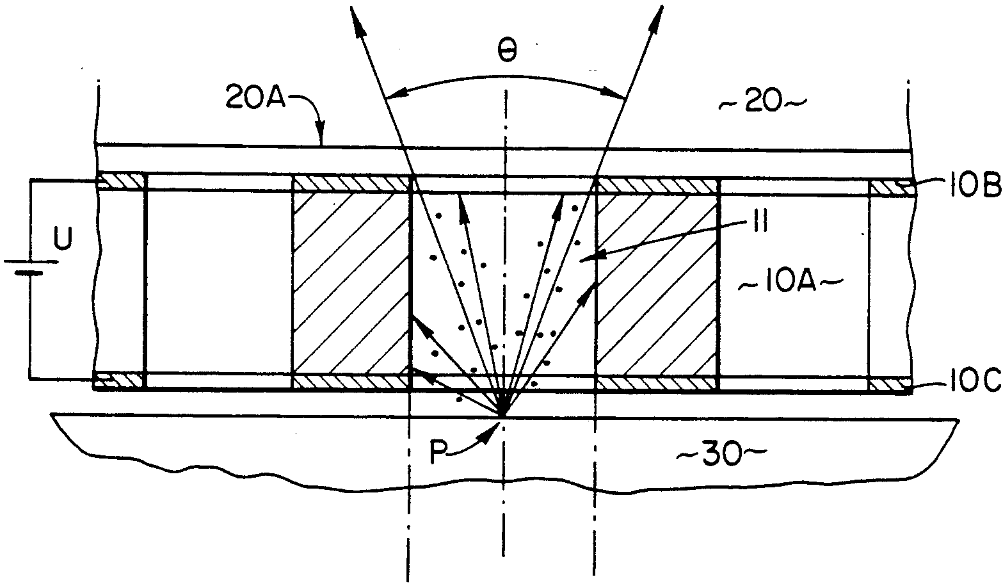
FIG. 3 is a cross-sectional detail view showing the structure of a collimator according to the invention.

It can be seen from FIG. 3 that the total radiation $I_O$, emitted from a point P, releases during its passage inside the through-bore 11 the secondary electrons indicated by points. Without a suction field, only a part of these secondary electrons reaches the entrance plane 20A, the counting rate I indicated in the detector therefore is mainly determined by the value of spatial angle $\Delta\Omega$ in that $$I_1 = I_O \cdot \Delta\Omega, \text{ where } \Delta\Omega \sim 2\pi(1-\cos\Theta).$$

Figure 4:
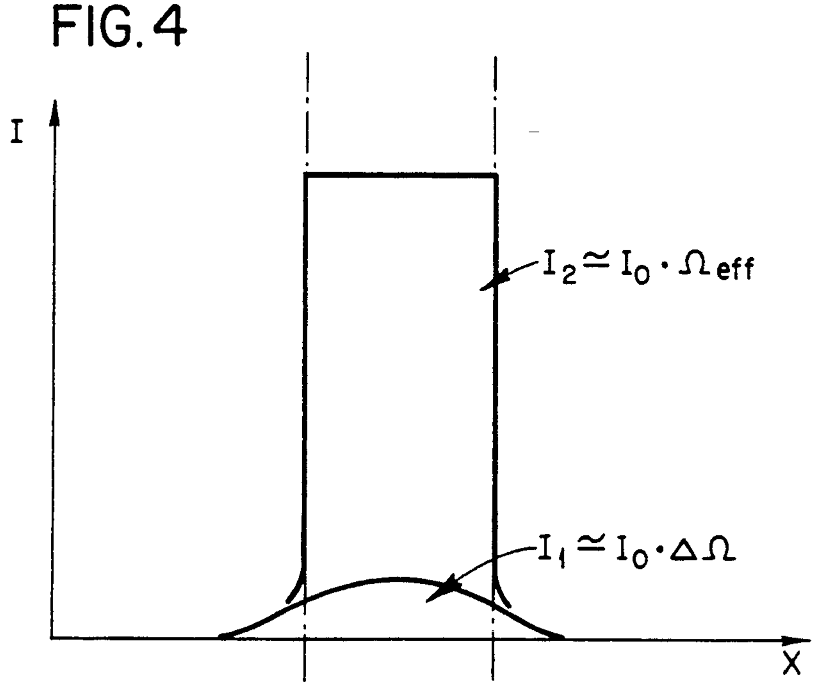
FIG. 4 is a diagram illustrating the improvement presented by the invention.

This function is qualitatively shown in FIG. 4 by the lower curve.

With the application of the suction field, not only are primary electrons pulled towards the detector by the suction field, but the major portion of the secondary electrons formed inside the through-bore 11 almost totally reaches the entrance plane 20A of detector 20 because of the effect of this suction field. This results in a counting rate $I_2$ which is considerably higher than $I_1$ and which is also shown in FIG. 4 qualitatively by the upper, rectangular, curve. This counting rate $I_2$ no longer is determined by the spatial angle section $\Omega$, but only by the ratio of the open surface of the collimator (sum of the diameters of the through-bores) to the total surface of the collimator and can be formally expressed by $$I_2 = I_O \cdot \Omega_{eff}$$

with $\Omega_{eff}$=open collimator surface/total collimator surface.

With an actual value of $\Omega_{eff}=0.5$, the result is $$I_2 = (\text{app}) 0.5 \cdot I_O.$$

Under actual conditions and with collimators without a suction field the result is a value of $I_1$=(app) 0.01 $I_O$. From this it follows that $I_2/I_1$ (app) 50, thus representing an increase in the counting rate by a factor of 50 with the use of the "suction field collimator".

Each electrically conductive layer 10B, 10C may consist of copper or aluminum and/or may be gold-plated or covered with graphite. In addition, each layer 10B, 10C may have the form of a foil and may be connected to core 10A. Each layer 10B, 10C may be applied to core 10A by vacuum evaporation.

The number of through-bores 11 per unit of surface area of collimator 10 is preferably approximately 50–300/cm2 and the ratio of the sum of the areas of through-bores 11 to the total surface of collimator 10 is preferably approximately 50–80%.

Insulating core 10A preferably has a thickness of approximately 1–10 mm, more preferably approximately 3–5 mm.

The magnitude of each distance x and y is preferably 0.1–2 mm.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A plate-shaped collimator with a plurality of through-bores for increasing locality-sensitivity during measurement of the radiation from a radioactive substance, by means of a detector disposed adjacent said collimator, wherein said collimator is provided with an insulating core having two opposed major surfaces, two electrically conductive layers each disposed on a respective collimator surface, and means connected for applying a voltage for creating, between said conductive layers, an electrical field which acts on charged particles emanating from the radioactive substance to exert on these particles a force having a main component which is directed towards the detector in a direction substantially perpendicular to said conductive layers, and further wherein said through-bores extend through said core and between said conductive layers, and there are approximately 50–300 of said through-bores per $cm^2$ of surface area.

2. A plate shaped collimator with a plurality of through-bores for increasing locality-sensitivity during measurement of the radiation from a radioactive substance, by means of a detector disposed adjacent said collimator, wherein said collimator is provided with an insulating core having two opposed major surfaces, two electrically conductive layers each disposed on a respective collimator surface, and means connected for applying a voltage for creating, between said conductive layers, an electrical field which acts on charged particles emanating from the radioactive substance to exert on these particles a force having a main component which is directed towards the detector in a direction substantially perpendicular to said conductive layers, and further wherein said through-bores extend through said core and between said conductive layers, and there are approximately 50–300 of said through-bores per $cm^2$ of surface area in combination with a radioactive substance emitting $\beta$ particle radiation adjacent said collimator.

3. A plate shaped collimator with a plurality of through-bores for increasing locality-sensitivity during measurement of the radiation from a radioactive substance, by means of a detector disposed adjacent said collimator, wherein said collimator is provided with an insulating core having two opposed major surfaces, two electrically conductive layers each disposed on a respective collimator surface, and means connected for applying a voltage for creating, between said conductive layers, an electrical field which acts on charged particles emanating from the radioactive substance to exert on these particles a force having a main component which is directed towards the detector in a direction substantially perpendicular to said conductive layers, and further wherein said through-bores extend through said core and between said conductive layers, and there are approximately 50–300 of said through-bores per $cm^2$ of surface area in combination with a locality-sensitive, one- or two- dimensional proportional counting tube containing said detector.

4. A collimator as defined in claim 1 wherein each said electrically conductive layer consists of copper or aluminum.

5. A collimator as defined in claim 4 wherein each said electrically conductive layer is gold-plated or covered with graphite.

6. A collimator as defined in claim 1 wherein each said electrically conductive layer is gold-plated or covered with graphite.

7. A collimator as defined in claim 1 wherein each said electrically conductive layer has the form of a foil and is connected to said insulating core.

8. A collimator as defined in claim 1 wherein each said electrically conductive layer is applied to said insulating core by vacuum evaporation.

9. A collimator as defined in claim 1 wherein the ratio of the sum of the areas of the through-bores to the total surface of the collimator is approximately 50–80%.

10. A collimator as defined in claim 1 wherein said insulating core is made of epoxy fiberglass (G10).

11. A collimator as defined in claim 1 wherein said insulating core has a thickness of approximately 1–10 mm.

12. A collimator as defined in claim 11 wherein said insulating core has a thickness of approximately 3–5 mm.

13. A collimator as defined in claim 1 wherein the voltage is approximately 100–2,000 volts.

14. A collimator as defined in claim 13 wherein the voltage is approximately 1,000 Volts.

15. A plate shaped collimator with a plurality of through-bores for increasing locality-sensitivity during measurement of the radiation from a radioactive substance, by means of a detector disposed adjacent said collimator, wherein said collimator is provided with an insulating core having two opposed major surfaces, two electrically conductive layers each disposed on a respective collimator surface, and means connected for applying a voltage for creating, between said conductive layers, an electrical field which acts on charged particles emanating from the radioactive substance to exert on these particles a force having a main component which is directed towards the detector in a direction substantially perpendicular to said conductive layers, and further wherein said through-bores extend through said core and between said conductive layers, and there are approximately 50–300 of said through-bores per $cm^2$ of surface area in combination with a detector having an entrance window and a carrier for the substance to be measured, wherein said collimator is disposed between said carrier and said entrance window of said detector.

16. A combination as defined in claim 15 wherein one said electrically conductive layer faces said carrier and said one electrically conductive layer and said carrier are connected to be at the same electrical potential, and the other one of said conductive layers is connected to be at ground potential.

17. A combination as defined in claim 16 wherein said one electrically conductive layer and said carrier are connected to be at a negative potential.

18. A combination as defined in claim 16 wherein the distance between said carrier and said one electrically conductive layer is approximately 0.1–2 mm.

19. A combination as defined in claim 16 wherein the distance between said entrance window of said detector and said other one of said conductive layers is approximately 0.1 to 2 mm.

20. A plate shaped collimator with a plurality of through-bores for increasing locality-sensitivity during measurement of the radiation from a radioactive substance, by means of a detector disposed adjacent said collimator, wherein said collimator is provided with an insulating core having two opposed major surfaces, two electrically conductive layers each disposed on a respective collimator surface, and means connected for applying a voltage for creating, between said conductive layers, an electrical field which acts on charged particles emanating from the radioactive substance to exert on these particles a force having a main component which is directed towards the detector in a direction substantially perpendicular to said conductive layers, and further wherein said through-bores extend through said core and between said conductive layers, and there are approximately 50–300 of said through-bores per $cm^2$ of surface area in combination with a detector unit which has a cathode plane, said collimator and said detector unit forming a detector assembly having an entrance plane formed by that one of said conductive layers which faces away from said detector unit, and wherein the other one of said conductive layers forms said cathode plane.

21. A combination as defined in claim 20 wherein said detector assembly has a housing, and said housing and said one of said conductive layers are connected to be at ground potential.

* * * * *